United States Patent [19]

Blanton, Jr.

[11] 4,252,635
[45] Feb. 24, 1981

[54] SULFUR OXIDES CONTROL IN CRACKING CATALYST REGENERATION

[75] Inventor: William A. Blanton, Jr., Woodacre, Calif.

[73] Assignee: Chevron Research Company, San Francisco, Calif.

[21] Appl. No.: 139,505

[22] Filed: Apr. 11, 1980

Related U.S. Application Data

[63] Continuation-in-part of Ser. No. 966,190, Dec. 4, 1978.

[51] Int. Cl.³ .................. C10G 47/20; B01J 37/14
[52] U.S. Cl. ........................ 208/114; 208/52 CT; 208/120; 252/411 R; 252/437; 423/244
[58] Field of Search ............... 208/113–120; 423/244

[56] References Cited

U.S. PATENT DOCUMENTS

| 4,087,383 | 5/1978 | Gernand et al. | 252/463 |
| 4,115,251 | 9/1978 | Flanders et al. | 208/120 |
| 4,146,463 | 3/1979 | Radford et al. | 208/120 |
| 4,152,400 | 5/1979 | Gernand et al. | 423/244 |
| 4,165,275 | 8/1979 | Blanton et al. | 208/120 |

*Primary Examiner*—Herbert Levine
*Assistant Examiner*—G. E. Schmitkons
*Attorney, Agent, or Firm*—D. A. Newell; W. H. Hooper; W. D. Reese

[57] ABSTRACT

In removing sulfur oxides from flue gas in a cracking catalyst regenerator in the presence of a silica-containing particulate catalyst by reacting the sulfur oxides with alumina in a particulate solid other than the catalyst, activity loss in the alumina as a result of migration of silica from the catalyst particles to the alumina-containing particles is decreased by using alumina-containing particles which contain sodium, manganese or phosphorus.

4 Claims, No Drawings

SULFUR OXIDES CONTROL IN CRACKING CATALYST REGENERATION

CROSS-REFERENCE TO RELATED APPLICATIONS

This application is a continuation-in-part of my copending application Ser. No. 966,190, filed on Dec. 4, 1978.

BACKGROUND OF THE INVENTION

The present invention relates to a method for reducing pollutant gas levels in flue gases generated in catalyst regenerators in hydrocarbon catalytic cracking systems.

Modern hydrocarbon catalytic cracking systems use a moving bed or fluidized bed of a particulate catalyst. Catalytic cracking is carried out in the absence of externally supplied molecular hydrogen, and is thereby distinguished from hydrocracking, in which hydrogen is added. In catalytic cracking, catalyst is subjected to a continuous cyclic cracking reaction and catalyst regeneration procedure. In a fluidized catalytic cracking (FCC) system, a stream of hydrocarbon feed is contacted with fluidized catalyst particles in a hydrocarbon cracking zone, or reactor, usually at a temperature of about 427°–600° C. The reactions of hydrocarbons in the hydrocarbon stream at this temperature result in deposition of carbonaceous coke on the catalyst particles. The resulting fluid products are thereafter separated from the coked catalyst and are withdrawn from the cracking zone. The coked catalyst is stripped of volatiles, usually with steam, and is cycled to a catalyst regeneration zone. In the catalyst regenerator, the coked catalyst is contacted with a gas, such as air, which contains a predetermined concentration of molecular oxygen to burn off a desired portion of the coke from the catalyst and simultaneously to heat the catalyst to a high temperature desired when the catalyst is again contacted with the hydrocarbon stream in the cracking zone. After regeneration, the catalyst is cycled to the cracking zone, where it is used to vaporize the hydrocarbons and to catalyze hydrocarbon cracking. The flue gas formed by combustion of coke in the catalyst regenerator is removed from the regenerator. It may be treated to remove particulates and carbon monoxide from it, after which it is normally passed into the atmosphere. Concern with the emission of pollutants in flue gas, such as sulfur oxides, has resulted in a search for improved methods for controlling such pollutants.

The amount of conversion obtained in an FCC cracking operation is the volume percent of fresh hydrocarbon feed changed to gasoline and lighter products during the conversion step. The end boiling point of gasoline for the purpose of determining conversion is conventionally defined as 221° C. Conversion is often used as a measure of the severity of a commercial FCC operation. At a given set of operating conditions, a more active catalyst gives a greater conversion than does a less active catalyst. The ability to provide higher conversion in a given FCC unit is desirable in that it allows the FCC unit to be operated in a more flexible manner. Feed throughput in the unit can be increased, or alternatively a higher degree of conversion can be maintained with a constant feed throughput rate. The type of conversion, i.e., selectivity, is also important in that poor selectivity results in less naphtha, the desired cracked product, and higher gas and coke makes.

The hydrocarbon feeds processed in commercial FCC units normally contain sulfur, usually termed "feed sulfur". It has been found that about 2–10% or more of the feed sulfur in a hydrocarbon feedstream processed in an FCC system is invariably transferred from the feed to the catalyst particles as a part of the coke formed on the catalyst particles during cracking. The sulfur deposited on the catalyst, herein termed "coke sulfur", is passed from the cracking zone on the coked catalyst into the catalyst regenerator. About 2–10% or more of the feed sulfur is continuously passed from the cracking zone into the catalyst regeneration zone in the coked catalyst. In an FCC catalyst regenerator, sulfur contained in the coke is burned along with the coke carbon and hydrogen, forming gaseous sulfur dioxide and sulfur trioxide, which are conventionally removed from the regenerator in the flue gas.

Most of the feed sulfur does not become coke sulfur in the cracking reactor. Instead, it is converted either to normally gaseous sulfur compounds such as hydrogen sulfide and carbon oxysulfide, or to normally liquid organic sulfur compounds. All these sulfur compounds are carried along with the vapor cracked hydrocarbon products recovered from the cracking reactor. About 90% or more of the feed sulfur is continuously removed from the cracking reactor in the stream of processed, cracked hydrocarbons, with about 40–60% of this sulfur being in the form of hydrogen sulfide. Provisions are conventionally made to recover hydrogen sulfide from the effluent from the cracking reactor. Typically, a very-low-molecular-weight off-gas vapor stream is separated from the $C_3+$ liquid hydrocarbons in a gas recovery unit, and the off-gas is treated, as by scrubbing it with an amine solution, to remove the hydrogen sulfide. Removal of sulfur compounds such as hydrogen sulfide from the fluid effluent from an FCC cracking reactor, e.g., by amine scrubbing, is relatively simple and inexpensive, relative to removal of sulfur oxides from an FCC regenerator flue gas by conventional methods. Moreover, if all the sulfur which must be removed from streams in an FCC operation could be recovered in a single operation performed on the reactor off-gas, the use of plural sulfur recovery operations in an FCC unit could be obviated, reducing expense.

It has been suggested to diminish the amount of sulfur oxides in FCC regenerator flue gas by desulfurizing a hydrocarbon feed in a separate desulfurization unit prior to cracking or to desulfurize the regenerator flue gas itself, by a conventional flue gas desulfurization procedure, after its removal from the FCC regenerator. Clearly, either of the foregoing alternatives requires an elaborate, extraneous processing operation and entails large capital and utilities expenses.

If sulfur normally removed from the FCC unit as sulfur oxides in the regenerator flue gas is instead removed from the cracking reactor as hydrogen sulfide along with the processed cracked hydrocarbons, the sulfur thus shifted from the regenerator flue gas to the reactor effluent constitutes simply a small increment to the large amount of hydrogen sulfide and organic sulfur invariably present in the reactor effluent. The small added expense, if any, of removing even as much as 5–15% more hydrogen sulfide from an FCC reactor off-gas by available means is substantially less than the expense of reducing the flue gas sulfur oxides level by separate feed desulfurization. Present commercial facilities for removing hydrogen sulfide from reactor off-gas can, in most if not all cases, handle any additional hydrogen sulfide which would be added to the off-gas if the sulfur normally discharged in the regenerator flue gas were substantially all shifted to form hydrogen sulfide in the FCC reactor off-gas. It is accordingly desirable to direct substantially all feed sulfur into the fluid cracked products removal pathway from the cracking reactor and thereby reduce the amount of sulfur oxides in the regenerator flue gas.

It has been suggested, e.g., in U.S. Pat. No. 3,699,037, to reduce the amount of sulfur oxides in FCC regenerator flue gas by adding particles of Group IIA metal oxides and/or carbonates, such as dolomite, MgO or $CaCO_3$, to the circulating catalyst in an FCC unit. The Group IIA metals react with sulfur oxides in the flue gas to form solid sulfur-containing compounds. The Group IIA metal oxides lack physical strength. Regardless of the size of the particles introduced, they are rapidly reduced to fines by attrition and rapidly pass out of the FCC unit with the catalyst fines. Thus, addition of dolomite and the like Group IIA materials is essentially a once-through process, and relatively large amounts of material must be continuously added in order to reduce the level of flue gas sulfur oxides.

It has also been suggested, e.g., in U.S. Pat. No. 3,835,031, to reduce the amount of sulfur oxides in an FCC regenerator flue gas by impregnating a Group IIA metal oxide onto a conventional silica-alumina cracking catalyst. The attrition problem encountered when using unsupported Group IIA metals is thereby reduced. However, it has been found that Group IIA metal oxides, such as magnesia, when used as a component of cracking catalysts, having a rather pronounced undesirable effect on the activity and selectivity of the cracking catalysts. The addition of a Group IIA metal to a cracking catalyst results in two particularly noticeable adverse consequences relative to the results obtained in cracking without the presence of the Group IIA metals: (1) the yield of the liquid hydrocarbon fraction is substantially reduced, typically by greater than 1 volume percent of the feed volume; and (2) the octane rating of the gasoline or naphtha fraction (24°-221° C. boiling range) is substantially reduced. Both of the above-noted adverse consequences are seriously detrimental to the economic viability of an FCC cracking operation, so that even complete removal of sulfur oxides from regenerator flue gas would not normally compensate for the simultaneous losses in yield and octane which result from adding Group IIA metals to an FCC catalyst.

Alumina has been a component of many FCC and moving-bed cracking catalysts, but normally in intimate chemical combination with at least 40 weight percent silica. Alumina itself has low acidity and has generally been considered to be undesirable for use as a cracking catalyst. The art taught that alumina is not selective, i.e., the cracked hydrocarbon products recovered from an FCC or other cracking unit using an alumina catalyst would not be desired valuable products, but would include, for example, relatively large amounts of $C_2$ and lighter hydrocarbon gases.

U.S. Pat. No. 4,071,436 discloses the use of alumina for reducing the amount of sulfur oxides in the flue gas formed during cracking catalyst regeneration. The alumina can be used in the form of a particulate solid mixed with cracking catalyst particles. In some cases, alumina contained in the cracking catalyst particles is also suitable; however, alumina contained in conventional cracking catalysts is usually not very active, since it is intimately mixed with a large fraction of silica.

U.S. Pat. Nos. 4,115,250 and 4,115,251 disclose the synergistic use of oxidation-promoting metals for carbon monoxide burning in combination with the use of alumina for reducing the amount of sulfur oxides in cracking catalyst regenerator flue gas. When alumina and highly active oxidation-promoting metals are both included in the same particle, alumina in the particle is ineffective for removing sulfur oxides from the regenerator flue gas, especially in the presence of even a small amount of carbon monoxide. On the other hand, when the alumina and combustion-promoting metal are used on separate particles circulated together in a cracking system in physical admixture, the ability of the alumina to reduce the level of sulfur oxides in the flue gas can be considerably enhanced.

In reducing the level of sulfur oxides in catalyst regenerator flue gas using alumina, as disclosed in U.S. Pat. Nos. 4,017,436, 4,115,250 and 4,115,251, in a catalytic cracking system under commercial operating conditions it has now been noted that silicon and silicon compounds, especially silica, in the particulate catalyst used in a catalytic cracking system, can exert an unexpected detrimental effect on the activity and stability of alumina contained in particles other than the catalyst particles in the particulate inventory, with respect to the capacity and rate of reaction of the alumina in forming sulfur-containing solids in a catalyst regenerator. Silicon contained in zeolitic crystalline aluminosilicates apparently does not migrate to any substantial extent, and therefore does not cause alumina deactivation. Previously, it was known that contamination of alumina by silica presented a problem when the silica was chemically combined with alumina prior to introduction into the circulating particulate solids inventory, or, more generally, when the silica was already present in the same particles as the alumina. It has now been found that under the conditions found in commercial catalytic cracking and regeneration systems, silica can migrate from particles of higher silica concentration to particles of lower or zero silica concentration during circulation of a mixture of such particles in a cracking system. Silica which is subject to such migration may be termed "amorphous" or "non-crystalline" silica, to distinguish it from silica in the form of zeolite crystalline aluminosilicates, which is relatively stable and is subject to little or no migration between particles under commercial FCC operating conditions. It is believed that the silicon is carried between particles in the hot gases, such as steam, which are present in catalytic cracking systems. The present invention is directed, in part, to overcoming the problem of deactivation of alumina resulting from silica migration from high-silica-content particles to alumina-containing particles in the particulate solids inventory in a catalytic cracking system.

SUMMARY OF THE INVENTION

In an embodiment of the present invention, an improvement is provided in a process for cracking a sulfur-containing hydrocarbon stream in the absence of externally supplied molecular hydrogen including the steps of (a) cycling an inventory of particulate solids involving acidic cracking catalyst particles between a cracking zone and a catalyst regeneration zone; (b) cracking the sulfur-containing hydrocarbon stream in the cracking zone in contact with the cracking catalyst particles, the catalyst particles containing at least 20 weight percent of a silicon component, calculated as silica and excluding silicon in the form of zeolitic crystalline aluminosilicate, in a cracking zone at cracking conditions including a temperature in the range from 425° C. to 700° C., whereby sulfur-containing coke is deposited on the catalyst particles, and removing the hydrocarbon stream from the cracking zone; (c) passing coke-containing catalyst particles from the cracking zone and an oxygen-containing gas into the catalyst regeneration zone, burning the sulfur-containing coke therein at a temperature in the range from 538° C. to 816° C. to form a flue gas containing sulfur oxides, and removing the flue gas from the catalyst regeneration zone; (d) forming a sulfur-containing solid in the regeneration zone by reacting the sulfur oxides with alumina in at least one particulate solid in the particulate solids inventory other than the catalyst particles, the particulate solid containing less than 20 weight percent silicon, calculated as silica; (e) returning the resulting coke-depleted catalyst particles from the catalyst regeneration zone to contact with the hydrocarbon stream in the cracking zone; and (f) forming hydrogen sulfide in the cracking zone by contacting the sulfur-containing solid with the hydrocarbon stream; the method for reducing poisoning of alumina in the particulate solid for reaction with sulfur oxides caused by migration of silicon or a silicon compound from the catalyst particles onto the particulate solid, comprising:

employing in the particulate solid from 100 parts per million by weight to 1.0 weight percent, relative to the amount of alumina in the particulate solid and calculated on an elemental basis, of a promoter comprising at least one element or compound of an element selected from sodium, manganese and phosphorus.

Sulfur oxides can be removed from the regenerator flue gas by reaction with high-surface-area alumina present in particles other than the catalyst, circulated in physical mixture with siliceous catalyst particles in a cracking system. Silicon and/or silicon compounds such as silica migrate from the catalyst particles to the alumina particles, especially in a steam-containing atmosphere such as a catalyst stripper or regenerator. Poisoning of the active alumina component by contamination with silica migrating from the catalyst particles is reduced, according to the invention, by employing alumina-containing particles including at least one element or compound of an element selected from sodium, manganese and phosphorus. It has been found that active alumina loses at least part of its capacity to react with sulfur oxides when contaminated with migrating silica. The loss of activity can be substantially lessened by including at least one of the above-mentioned elements, or a compound thereof, in the alumina-containing particles.

DETAILED DESCRIPTION OF THE INVENTION

The present invention is used in connection with a fluid catalyst cracking process for cracking hydrocarbon feeds. The same hydrocarbon feeds normally processed in commercial FCC systems may be processed in a cracking system employing the present invention. Suitable feedstocks include, for example, petroleum distillates or residuals, either virgin or partially refined. Synthetic feeds such as coal oils and shale oils are also suitable.

Suitable feedstocks normally boil in the range from about 200°–600° C. or higher. A suitable feed may include recycled hydrocarbons which have already been subjected to cracking.

The cracking catalysts with which the present invention finds utility are those which include a substantial concentration of silica and which are recognized by those skilled in the art to be suitably acidic and active for catalyzing cracking of hydrocarbons in the absence of externally supplied molecular hydrogen. The invention is most useful in connection with catalysts containing at least 20 weight percent silica, especially at least 30 weight percent silica, excluding silica in the form of zeolitic crystalline aluminosilicates. Silica is generally included in commercially used cracking catalysts in combination with one or more other inorganic oxides such as alumina, magnesia, etc. Many commercial catalysts presently include a zeolite component associated with a non-crystalline silica-alumina or silica-containing clay matrix. Non-zeolite-type catalysts including silica, such as amorphous silica-aluminas, silica-magnesias, clays, etc., are also within the scope of the invention, however. Particularly suitable cracking components are the acidic, zeolitic crystalline aluminosilicates such as X-type and Y-type faujasites, preferably in the hydrogen form, the rare earth form, or other equally stable form. Zeolitic crystalline aluminosilicates are preferred acidic cracking components in that silicon included in zeolites is not particularly subject to migration between particles during use in catalytic cracking, and thus do not contribute to poisoning of alumina activity for sulfur oxides removal from flue gas. Preferably, the particulate solids inventory used in a system in an embodiment of the invention includes at least 75 weight percent of particles containing from 5 to 30 weight percent of a zeolitic crystalline aluminosilicate. On the other hand, acidic, non-crystalline catalyst such as silica-aluminas can be used. For example, it may be desirable, for economic reasons, to use a mixture of cracking catalysts, one of which contains a zeolitic cracking component, while the other contains only relatively inexpensive amorphous silica-alumina, e.g., in systems where catalyst must be added frequently as a result of high feed metals levels or the like.

A zeolite-containing cracking catalyst component may be formed by treatment of kaolin clay, as by slurrying the clay, sizing and spray drying, followed by treatment with caustic at elevated temperature for a time sufficient to generate a fraction of the desired zeolite in the treated clay, with the clay acting as the matrix. The zeolite component in the particles can then be converted to the ammonium and/or rare earth form by ion-exchange, if desired. Of course, there is usually still a substantial non-crystalline silica content in catalysts manufactured in this manner. The zeolite can also be manufactured separately and added to the desired matrix or binder material. Conventional binders such as clays, acid-treated clays, synthetic silica-alumina cogels, etc., can be used as the binder, or as a component of the binder.

Cracking conditions employed in the cracking or conversion step in an FCC system are frequently provided in part by pre-heating and heat-exchanging hydrocarbon feeds to bring them to a temperature of about 315°–400° C. before introducing them into the cracking zone; however, pre-heating of the feed is not essential. Cracking conditions usually include a catalyst/hydrocarbon weight ratio of about 3–10. A hydrocarbon weight space velocity in the cracking zone of about 5–50 per hour is preferably used. The average amount of coke contained in the catalyst after contact with the hydrocarbons in the cracking zone, when the catalyst is passed to the regenerator, is preferably between about 0.5 weight percent and about 2.5 weight percent, depending in part on the carbon content of regenerated catalyst in the particular system, as well as the heat balance of the particular system.

The catalyst regeneration zone used in an FCC system employing an embodiment of the present invention may be of conventional design. Preferably, the total pressure in the regeneration zone is maintained at at least 20 psig. The gaseous atmosphere within the regeneration zone normally includes a mixture of gases in concentrations which vary according to the locus within the regenerator. The concentrations of gases also vary according to the coke concentration on catalyst particles entering the regenerator and according to the amount of molecular oxygen and steam passed into the regenerator. Generally, the gaseous atmosphere in a regenerator contains 5–25% steam, varying amounts of oxygen, carbon monoxide, carbon dioxide and nitrogen. The present invention is applicable in cases in which an oxygen-containing and nitrogen-containing gas, such as air, is employed for combustion of coke in the catalyst regenerator. As will be appreciated by those skilled in the art, air is essentially invariably employed to provide the oxygen needed for combustion in FCC regenerators.

Sulfur oxides are removed from the flue gas in a catalyst regeneration zone by reacting sulfur oxides, e.g., sulfur trioxide, with alumina in the regeneration zone. The alumina active for reaction with sulfur oxides usually has a surface area of at least 50 m$^2$/g, e.g., gamma- or eta-alumina. Suitable alumina must not be in intimate combination with more than 20 weight percent silica, based on the alumina and silica concentrations in a given particle, and preferably the alumina-containing particles used are substantially free from admixture with silica. Alumina from any source is suitable for use in the present method if it contains an average of about 0.1 to 100 weight percent of "reactive alumina", as determined by treating particles containing the alumina by the following steps:

(1) passing a stream of a gas mixture containing, by volume, 10% water, 1% hydrogen sulfide, 10% hydrogen and 79% nitrogen over the solid particle continuously at a temperature of 650° C. and atmospheric pressure until the weight of the solid particle is substantially constant;

(2) passing a stream of a gas mixture containing, by volume, 10% water, 15% carbon dioxide, 2% oxygen and 73% nitrogen over the solid particle resulting from step (1) at a temperature of 650° C. and atmospheric pressure until the weight of the solid particle is substantially constant, the weight of the particle at this time being designated "Wa"; and (3) passing a stream of a gas mixture containing, by volume, 0.05% sulfur dioxide, and, in addition, the same gases in the same proportions as used in step (2), over the solid particle resulting from step (2) at a temperature of 650° C. and atmospheric pressure until the weight of the solid particle is substantially constant, the weight of the solid particle at this time being designated "Ws".

The weight fraction of reactive alumina in the solid particle, designated "Xa", is determined by the formula $$Xa = \frac{Ws - Wa}{Wa} \times \frac{\text{Molecular Wt. Alumina}}{3 \times \text{Molecular Wt. Sulfur Trioxide}}$$

The alumina used in embodiments of the present invention is included in particulate solids, other than catalyst particles, which are physically suitable for circulation in the cracking system. Suitable particles normally have an alumina content of at least 80 weight percent and, preferably, the alumina content of such particles is 90 weight percent or more. In a particularly preferred embodiment, the alumina-containing particles consist of gamma-alumina. Alumina can be formed into particles of suitable size for circulation with FCC catalyst in an FCC system by spray-drying, crushing larger particles, etc.

In carrying out the invention, alumina-containing particles are introduced into a cracking system and circulated in physical mixture with silica-containing cracking catalyst. The amount of separate, alumina-containing particles employed in the particulate solids inventory is preferably 25 weight percent, or less, of the total particulate solids inventory circulating in the cracking system. The addition of an amount of alumina between 1.0 and 25 weight percent of the total particulate solids inventory is particularly preferred. The size, shape and density of separate, alumina-containing particles, circulated in admixture with catalyst particles is preferably such that the alumina-containing particles circulate in substantially the same manner as conventional catalyst particles in the particular cracking system, e.g., beads are used in a moving-bed, bead-catalyst unit, whereas 50–100 micron diameter particles are quite suitable in an FCC unit. Alumina reacts with sulfur trioxide or sulfur dioxide and oxygen in the cracking catalyst regenerator to form at least one sulfur-containing solid, such as a sulfate of aluminum. In this way, sulfur oxides are removed from the regenerator atmosphere and are not discharged from the regenerator in the flue gas.

Particles containing the solid aluminum- and sulfur-containing material are passed to the cracking zone along with the other particulate solids, such as regenerated catalyst. In the cracking zone, alumina is regenerated and hydrogen sulfide is formed by reaction of sulfur in the sulfur-containing solid by contacting the sulfur-containing solid with the stream of hydrocarbon being treated in the cracker. In addition to forming hydrogen sulfide, the reaction between the sulfur- and aluminum-containing solid and the hydrocarbon feed may produce some other sulfur compounds such as carbon oxysulfide, organic sulfides, etc., which are vapor-phase at cracking conditions. The resulting hydrogen sulfide and other vapor-phase sulfur compounds exit the cracking zone as a part of the stream of cracked hydrocarbons, along with a much larger amount of vapor-phase sulfur compounds formed directly from sulfur in the hydrocarbon feed during the cracking reactions. Off-gas subsequently separated from the cracked hydrocarbon stream thus includes hydrogen sulfide formed directly from the feed sulfur and hydrogen sulfide formed by reaction of the sulfur- and aluminum-containing solid with the hydrocarbon stream in the cracking zone.

I have found that, by including at least one of sodium, manganese or phosphorus in the alumina-containing particles employed to react with sulfur oxides, deactivation of the alumina for reaction with SO$_x$, caused by silica migration, can be substantially reduced. Although sodium, manganese and phosphorus, or compounds thereof, are the most useful materials for addition to alumina to prevent deactivation by migrating silica, several other materials can have a positive effect in many cases. These include lithium, potassium, nickel, lanthanum, tin and iron. On the other hand, these last-mentioned materials do not appear to be as effective as sodium, manganese or phosphorus, judging from data presently available.

The sodium, manganese or phosphorus component can be combined with the alumina in any convenient manner. For example, a water-soluble compound can be introduced into particles containing alumina by aqueous impregnation. The desired material can be mixed with alumina prior to shaping, as by dry-mixing, comulling, or the like. The amount of sodium, manganese or phosphorus added, on an elemental basis, is usually at least 100 parts per million, by weight, of the alumina. The maximum amount added is 1.0 weight percent. Preferably, not more than 0.5 weight percent of the promoter is included with the alumina, on an elemental basis. The concentrations of promoter are based on the alumina content of the alumina-containing particulate solid. Those skilled in the art will recognize that the alumina may be combined as a mixture, particle pack, or the like, with other materials, such as other porous inorganic oxides, such as chromia, magnesia, titania, etc.

Surprisingly, I have found that concentrations of sodium, manganese or phosphorus in alumina of 0.1 weight percent are more effective in preventing silica-deactivation of the alumina than are higher concentrations such as 0.5 weight percent or more.

EXAMPLE I

Samples of particulate alumina impregnated with water-soluble salts of various promoters were prepared. The alumina employed was Reynolds RH-30, commercially available material. Two samples of alumina containing each promoter were prepared, one containing 0.1 weight percent promoter and the other containing 0.5 weight percent. All samples were prepared by aqueous impregnation with a water-soluble salt. Each sample was calcined at 593° C. in dry air for 4 hours.

EXAMPLE II

An 0.5-gram portion of each sample prepared as described in Example I was physically mixed with 4.5 grams of an equilibrium zeolite-containing FCC catalyst of commercially available type, containing about 37 weight percent silica, excluding silica in the form of zeolite crystalline aluminosilicate. Each of the ctalyst-alumina particle mixtures was then steamed for 96 hours at 650° C. to induce silica migration from the catalyst particles to the alumina particles. The rates of reaction of the steamed samples of alumina were taken determined by thermogravimetric analysis by the following procedure: (1) a portion of each steamed catalyst-alumina mixture was heated to 650° C. in a flowing atmosphere containing, by volume, 2% $O_2$, 15% $CO_2$ and 10% $H_2O$ in $N_2$ until the weight of the sample was constant; (2) the atmosphere composition was changed to 10% $H_2$ and 10% $H_2O$ in $N_2$ and maintained until the weight of the sample was constant; (3) the atmosphere was returned to the composition used in step (1) and maintained until the sample weight was constant; and (4) 0.2% $SO_2$ was added to the atmosphere and the weight gained during 6 minutes of exposure to $SO_2$ was measured. The rate of reaction for the samples is defined as the average weight gain per minute for the first 6 minutes divided by the total weight of the sample after step (3). The results for each promoted alumina, for a control sample of unpromoted alumina, and for a sample of catalyst without alumina particles are shown in Table I. Referring to Table I, it can be seen that sodium, manganese and phosphorus promoters provide a substantially higher activity for reaction with $SO_x$ after a sample has been subjected to silica migration than do the other promoters tested, particularly in the samples containing 0.1 weight percent of the promoters.

TABLE I

| Promoter | Rate (ppm/minute) | |
| --- | --- | --- |
| | 0.1 wt. % | 0.5 wt. % |
| Phosphorus | 77 | 66 |
| Manganese | 71 | 63 |
| Sodium | 74 | 68 |
| Nickel | 69 | 61 |
| Lanthanum | 64 | 64 |
| Tin | 60 | 62 |
| Iron | 64 | 67 |
| Copper | 66 | 61 |
| Vanadium | 62 | 43 |
| Titanium | 63 | 51 |
| Magnesium | 60 | 56 |
| Cerium | 59 | 54 |
| Lead | 52 | 59 |
| Boron | 53 | 46 |
| Molybdenum | 46 | 50 |
| Arsenic | 57 | 52 |
| None | 54 | 54 |
| Catalyst alone | 51 | 51 |

EXAMPLE III

For purposes of comparison with the alumina particles used in the improvement of the invention, particles of silica gel were impregnated with sodium or manganese. The silica gel used was Davison Grade 70 gel screened to 100–325 mesh. Four sample of silica gel were impregnated with an aqueous solution of either sodium nitrate or manganese nitrate in amounts sufficient to provide a sample containing 0.1 weight percent sodium, 0.5 weight percent sodium, 0.1 weight percent manganese and 0.5 weight percent manganese.

EXAMPLE IV

A 0.5 gram sample of the plain gel was mixed with 4.5 grams of the same equilibrium zeolite-containing FCC catalyst used in the test of Example II. Four mixtures were made up each containing 4.5 grams of the FCC catalyst and 0.5 grams of the silica gel containing either 0.1 weight percent Na, 0.5 weight percent Na, 0.1 weight percent Mn or 0.5 weight percent Mn. The five mixtures prepared as described were each steamed for 96 hours at 650° C. The rate of reaction, if any, for reaction with sulfur oxides was then measured by the same procedure described in Example II. The results for the unmixed catalyst and each of the five mixtures are shown in Table II.

TABLE II

| Promoter | Rate (ppm/minute) | |
| --- | --- | --- |
| | 0.1 wt. % | 0.5 wt. % |
| Unmixed Catalyst | 51 | 51 |
| Catalyst with Plain Silica Gel | 29 | 29 |
| Manganese Impregnated | 40 | 37 |

TABLE II-continued

| Promoter | Rate (ppm/minute) | |
|---|---|---|
| | 0.1 wt. % | 0.5 wt. % |
| Sodium Impregnated | 31 | 27 |

Referring to Table II, it is apparent that all the silica gel mixtures are substantially poorer for reacting with sulfur oxides than is the FCC catalyst alone.

ILLUSTRATIVE EMBODIMENT

A conventional, commercial FCC processing system having a capacity of 22,000 barrels per day is employed. The feed used is a mixture of hydrocarbons having a boiling range of 304°–593° C. with a sulfur content of 0.85 weight percent. The cracking reactor employs a combination of riser and dense-bed cracking. Cracking conditions employed include a reactor average temperature of about 495° C., a hydrocarbon weight hourly space velocity of about 5 per hour and a conversion rate (feed converted to 220° C.-) of about 85%. Catalyst is circulated at the rate of about 8 metric tons per minute with a total inventory of about 154 metric tons. The catalyst used contains Y-type zeolitic crystalline aluminosilicate dispersed in a non-crystalline silica-alumina matrix. A separate combustion promoter is used to get complete combustion in the regenerator. The silica concentration in the catalyst, excluding silica in the form of zeolite, is about 40 weight percent. The spent catalyst contains about 0.8 weight percent coke, and the coke contains about 0.7 weight percent sulfur. Regeneration conditions include a temperature of about 670° C. After regeneration, the catalyst contains about 0.2 weight percent coke. Prior to the introduction of alumina into the circulating inventory to react with $SO_x$, the flue gas removed from the catalyst regenerator contains about 300 parts per million, by volume, of $SO_x$, calculated as $SO_2$. For purposes of comparison, an untreated particulate gamma-alumina is first used to remove $SO_x$ from the regenerator flue gas. Sufficient alumina is introduced and circulated to provide 10 weight percent of the particulate solids inventory. The amount of $SO_x$ initially removed from the flue gas is relatively high, but over a period of 5 days of operation it is observed that migration of silica from the cracking catalyst particles reduces the activity of the alumina, so that the amount of $SO_x$ in the flue gas increases to about 220 ppm (volume). According to the invention, the unpromoted alumina is withdrawn from the FCC system, and particles of alumina promoted with 0.1 weight percent phosphorus are introduced in an amount sufficient to provide 10 weight percent of the particulate solids inventory in the FCC system. The promoted alumina has been prepared by spray-drying the alumina and subsequent aqueous impregnation with ammonium phosphate solution. After introduction of the phosphorus-promoted alumina, the amount of $SO_x$ initially removed from the regenerator flue gas is again found to be relatively high. After 5 days of operation, substantially less silica migration deactivation of the phosphorus-promoted alumina is observed than was found using the unpromoted alumina, resulting in a flue gas $SO_x$ of only 140 ppm (volume).

The foregoing detailed description of the invention, examples, and illustrative embodiment illustrate a preferred mode of carrying out the invention. It will be clear to those skilled in the art that other embodiments and obvious modifications, equivalents and variations of the invention can be employed and adapted to a variety of catalytic cracking systems. Such modifications, alterations and adaptations are intended to be included within the scope of the appended claims.

What is claimed is:

1. In a process for cracking a sulfur-containing hydrocarbon stream in the absence of externally supplied molecular hydrogen including the steps of (a) cycling an inventory of particulate solids including acidic cracking catalyst particles between a cracking zone and a catalyst regeneration zone; (b) cracking said sulfur-containing hydrocarbon stream in said cracking zone in contact with said cracking catalyst particles, said catalyst particles containing at least 20 weight percent of a silicon component, calculated as silica and excluding silicon in the form of zeolite crystalline aluminosilicate, in a cracking zone at cracking conditions including a temperature in the range from 425° C. to 700° C., whereby sulfur-containing coke is deposited on said catalyst particles, and removing the hydrocarbon stream from said cracking zone; (c) passing coke-containing catalyst particles from said cracking zone and an oxygen-containing gas into said catalyst regeneration zone, burning said sulfur-containing coke therein at a temperature in the range from 538° C. to 816° C. to form a flue gas containing sulfur oxides, and removing said flue gas from said catalyst regeneration zone; (d) forming a sulfur-containing solid in said regeneration zone by reacting said sulfur oxides with alumina in at least one particulate solid in said particulate solids inventory other than said catalyst particles, said particles containing less than 20 weight percent silicon, calculated as silica; (e) returning the resulting coke-depleted catalyst particles from said catalyst regeneration zone to contact with said hydrocarbon stream in said cracking zone; and (f) forming hydrogen sulfide in said cracking zone by contacting said sulfur-containing solid with said hydrocarbon stream; the method for reducing poisoning of alumina in said particulate solid for reaction with sulfur oxides caused by migration of silicon or a silicon compound from said catalyst particles onto said particulate solid, comprising:

employing in said particulate solid from 100 parts per million, by weight, to 1.0 weight percent, relative to the amount of alumina in said particulate solid and calculated on an elemental basis, of a promoter comprising at least one element or compound of an element selected from sodium, manganese and phosphorus.

2. A method according to claim 1 wherein said alumina-containing particulate solid includes from 100 parts per million, by weight, to 0.5 weight percent, based on alumina in said particulate solid, of phosphorus.

3. A method according to claim 1 wherein said alumina-containing particulate solid includes from 100 parts per million, by weight, to 0.5 weight percent, based on alumina in said particulate solid, of sodium.

4. A method according to claim 1 wherein said slumina-containing particulate solid includes from 100 parts per million, by weight, to 0.5 weight percent, based on alumina in said particulate solid, of manganese.

* * * * *